US012703712B2

(12) United States Patent
Xiao et al.

(10) Patent No.: US 12,703,712 B2
(45) Date of Patent: Aug. 11, 2026

(54) INDENONAPHTHOPYRANS HAVING TRIALKYLSILYL AND ETHYLENICALLY UNSATURATED GROUPS

(71) Applicant: Transitions Optical, Ltd., Tuam (IE)

(72) Inventors: Wenjing Xiao, Murrysville, PA (US); Beon-Kyu Kim, Gibsonia, PA (US); Robert W. Walters, Murrysville, PA (US)

(73) Assignee: Transitions Optical, Ltd., Tuam (IE)

( * ) Notice: Subject to any disclaimer, the term of this patent is extended or adjusted under 35 U.S.C. 154(b) by 445 days.

(21) Appl. No.: 18/284,923

(22) PCT Filed: Mar. 30, 2021

(86) PCT No.: PCT/EP2021/058248

§ 371 (c)(1),
(2) Date: Sep. 29, 2023

(87) PCT Pub. No.: WO2022/207074

PCT Pub. Date: Oct. 6, 2022

(65) Prior Publication Data

US 2024/0376132 A1 Nov. 14, 2024

(51) Int. Cl.
*C07F 7/08* (2006.01)
*C09K 9/02* (2006.01)
*G02B 1/04* (2006.01)

(52) U.S. Cl.
CPC .............. *C07F 7/0812* (2013.01); *C09K 9/02* (2013.01); *G02B 1/041* (2013.01); *C09K 2211/1018* (2013.01)

(58) Field of Classification Search
CPC .. C07F 7/0812; C09K 9/02; C09K 2211/1018
See application file for complete search history.

(56) References Cited

U.S. PATENT DOCUMENTS

| | | | |
|---|---|---|---|
| 5,651,923 A | 7/1997 | Kumar et al. | |
| 5,658,501 A | 8/1997 | Kumar et al. | |
| 6,802,993 B2 | 10/2004 | Momoda et al. | |
| 7,256,921 B2 | 8/2007 | Kumar et al. | |
| 7,557,208 B2 | 7/2009 | Walters et al. | |
| 8,518,305 B2 | 8/2013 | Tomasulo | |
| 8,608,988 B2 | 12/2013 | Bowles et al. | |
| 8,697,770 B2 | 4/2014 | Duis et al. | |
| 8,697,777 B2 | 4/2014 | Sooknoi et al. | |
| 8,772,236 B2 | 7/2014 | Timmerman et al. | |
| 8,778,236 B2 | 7/2014 | Takenaka et al. | |
| 8,815,771 B2 | 8/2014 | Chopra et al. | |
| 8,865,029 B2 | 10/2014 | Evans et al. | |
| 8,889,807 B2 | 11/2014 | Hickenboth et al. | |
| 8,920,928 B2 | 12/2014 | He et al. | |
| 9,028,728 B2 | 5/2015 | Bancroft et al. | |
| 9,040,648 B2 | 5/2015 | Hickenboth et al. | |
| 9,139,552 B2 * | 9/2015 | Xiao .................... | C07D 495/04 |
| 9,487,693 B2 | 11/2016 | Izumi et al. | |
| 10,310,293 B2 | 6/2019 | Duis et al. | |
| 2003/0036579 A1 | 2/2003 | Momoda et al. | |
| 2011/0108781 A1 * | 5/2011 | Tomasulo ............. | C07F 7/1804 546/14 |
| 2011/0140056 A1 | 6/2011 | He et al. | |
| 2011/0147681 A1 | 6/2011 | Evans et al. | |
| 2011/0249235 A1 | 10/2011 | Duis et al. | |
| 2012/0156508 A1 | 6/2012 | He et al. | |
| 2013/0269445 A1 | 10/2013 | Chopra et al. | |

(Continued)

FOREIGN PATENT DOCUMENTS

| | | | |
|---|---|---|---|
| AR | 080898 A1 | | 5/2012 |
| AU | 777331 B2 | | 4/2002 |
| AU | 2011240801 B2 | | 10/2011 |
| CN | 102112528 A | | 6/2011 |
| CN | 102834740 A | | 12/2012 |
| EP | 1293522 A1 | | 3/2003 |
| EP | 2294114 B1 | | 8/2012 |
| EP | 2684886 A1 | | 1/2014 |
| EP | 2725017 A1 | | 4/2014 |
| JP | 2004210657 A | * | 7/2004 |
| WO | 2014151543 A1 | | 9/2014 |
| WO | 2014152259 A1 | | 9/2014 |

OTHER PUBLICATIONS

CAS abstract-RN 1304678-93-0 (Year: 2011).*

*Primary Examiner* — Alexander R Pagano
*Assistant Examiner* — Frank S. Hou
(74) *Attorney, Agent, or Firm* — The Webb Law Firm

(57) ABSTRACT

The present invention relates to indenonaphthopyran compounds represented by the following Formula (I). With reference to Formula (I), $R^1$ through $R^6$ are as described in the specification. There is provided that the indenonaphthopyran compound represented by Formula (I) includes: (i) at least one trialkylsilyl group; and (ii) at least one ethylenically unsaturated radically polymerizable group selected from vinylphenyl, acrylate, methacrylate, acrylamide, or methacrylamide. The present invention also relates to photochromic compositions and photochromic articles that include indenonaphthopyran compounds represented by Formula (I).

(I)

12 Claims, No Drawings

(56) References Cited

U.S. PATENT DOCUMENTS

| | | | |
|---|---|---|---|
| 2013/0273380 | A1 | 10/2013 | Hickenboth et al. |
| 2013/0274412 | A1 | 10/2013 | Hickenboth et al. |

* cited by examiner

INDENONAPHTHOPYRANS HAVING TRIALKYLSILYL AND ETHYLENICALLY UNSATURATED GROUPS

CROSS-REFERENCE TO RELATED APPLICATION

This application is the United States national phase of International Application No. PCT/EP2021/058248 filed Mar. 30, 2021, the disclosure of which is hereby incorporated by reference in its entirety.

FIELD

The present invention relates to indenonaphthopyran compounds having at least one trialkylsilyl group and at least one ethylenically unsaturated radically polymerizable group, and to photochromic compositions and photochromic articles including such indenonaphthopyran compounds.

BACKGROUND

In response to certain wavelengths of electromagnetic radiation (or "actinic radiation"), photochromic compounds, such as indenonaphthopyrans (or indeno-fused naphthopyrans), typically undergo a transformation from one form or state to another form, with each form having a characteristic or distinguishable absorption spectrum associated therewith. Typically, upon exposure to actinic radiation, many photochromic compounds are transformed from a closed-form, which corresponds to an unactivated (or bleached, e.g., substantially colorless) state of the photochromic compound, to an open-form, which corresponds to an activated (or colored) state of the photochromic compound. In the absence of exposure to actinic radiation, such photochromic compounds are reversibly transformed from the activated (or colored) state, back to the unactivated (or bleached) state. Compositions and articles, such as eyewear lenses, that contain photochromic compounds or have photochromic compounds applied thereto (e.g., in form of a photochromic coating composition) typically display colorless (e.g., clear) and colored states that correspond to the colorless and colored states of the photochromic compounds contained therein or applied thereto.

Photochromic compounds can be incorporated into a polymeric matrix, which can result in the formation of a photochromic article, such as a photochromic ophthalmic lens. It is generally desirable that the photochromic compound have good compatibility with the polymeric matrix into which it is incorporated, which can result in, for example, efficient transitions between open and closed forms of the photochromic compound, and correspondingly improved photochromic performance. With some applications, it is also desirable that the photochromic compound undergoes minimal to no migration out of the polymeric matrix into which it is incorporated, such as from a layer or portion containing the photochromic compound into an adjacent layer or portion that is free of the photochromic compound.

It would be desirable to develop new indenonaphthopyran compounds that are photochromic, have good compatibility with the polymeric matrices into which they are incorporated, and which undergo minimal to no migration within and/or out of a polymeric matrix into which they are incorporated. Additionally, it would be desirable that such newly developed indenonaphthopyran compounds possess photochromic properties, such as but not limited to fade rate and/or optical density properties, that are at least the same as those of conventional indenonaphthopyran compounds.

SUMMARY

In accordance with the present invention, there is provided an indenonaphthopyran compound represented by the following Formula (I), (I)

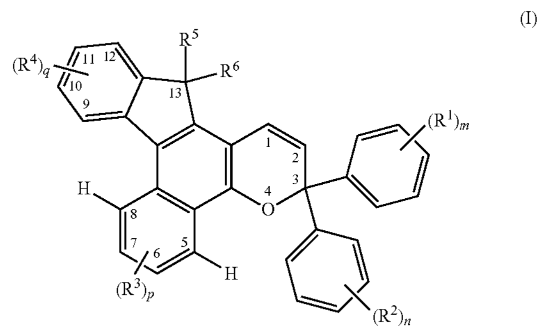

With reference to Formula (I): m is from 0 to 3; n is from 0 to 3; p is 1 or 2; and q is from 0 to 4.

With further reference to Formula (I), $R^1$ independently for each m, $R^2$ independently for each n, $R^3$ independently for each p, and $R^4$ independently for each q, in each case is independently,
- hydroxyl;
- cyano;
- (meth)acrylate or (meth)acrylamide;
- vinylphenyl;
- amino, or substituted nitrogen-containing heterocycle, or unsubstituted nitrogen-containing heterocycle;
- a halo group;
- a perhalo alkyl, or a perhalo aryl;
- substituted or unsubstituted alkyl;
- substituted or unsubstituted alkenyl;
- substituted or unsubstituted alkynyl;
- substituted or unsubstituted heterocycloalkyl;
- substituted or unsubstituted aryl;
- substituted or unsubstituted heteroaryl;
- substituted or unsubstituted alkoxy or substituted or unsubstituted aryloxy;
- substituted or unsubstituted alkylthio or substituted or unsubstituted arylthio;
- ketone, aldehyde, carboxylic acid ester, carboxylic acid, carboxylate, or amide;
- carbonate, carbamate, carbonyl amino, or urea;
- polyether, polyester, polycarbonate, or polyurethane;
- siloxy, alkoxysilane, or polysiloxane;
- trialkylsilyl; or
- combinations thereof; and $R^5$ and $R^6$ are each independently,
- substituted or unsubstituted alkyl;
- substituted or unsubstituted aryl;
- polyether, polyester, polycarbonate, or polyurethane;
- trialkylsilyl; or $R^5$ and $R^6$ together form a spirocyclic ring.

With additional reference to Formula (I), each nitrogen-containing heterocycle substituent, each alkyl substituent, each alkenyl substituent, each alkynyl substituent, each heterocycloalkyl substituent, each aryl substituent, each heteroaryl substituent, each alkoxy substituent, each aryloxy substituent, each alkylthio substituent, and each arylthio substituent are in each case independently selected from, halo, cyano, nitro, alkyl, alkenyl, alkynyl, haloalkyl, perhaloalkyl, heterocycloalkyl, aryl, heteroaryl, hydroxyl, thiol, alkyl ether, alkyl thioether, aryl ether, aryl thioether, ketone, aldehyde, carboxylic acid ester, carboxylic acid, carboxylate, siloxane, alkoxysilane, polysiloxane, amide, amino, nitrogen-containing heterocycle, alkyl amine, aryl amine, carbamate, carbonate, urea, polyester group, polyether group, polycarbonate group, polyurethane group, trialkylsilyl, an acrylate group, a methacrylate group, an acrylamide group, a methacrylamide group, a vinylphenyl group, combinations thereof, or two or more thereof.

There is provided that the indenonaphthopyran compound represented by Formula (I) comprises, (i) at least one trialkylsilyl group, and (ii) at least one ethylenically unsaturated radically polymerizable group selected from vinylphenyl, acrylate, methacrylate, acrylamide, or methacrylamide.

The present invention also related to photochromic compositions and photochromic articles that, in each case, include one or more indenonaphthopyran compounds represented by Formula (I).

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DETAILED DESCRIPTION

As used herein, the articles "a", "an", and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as, but not limited to, 1 to 6.1, 3.5 to 7.8, and 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

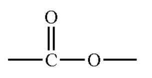

or equivalently —C(O)O—, is inclusive of the right-to-left representation thereof,

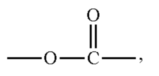

or equivalently —O(O)C— or —OC(O)—.

Unless otherwise indicated, all numbers expressing quantities of ingredients, reaction conditions, and so forth used in the specification and claims are to be understood as modified in all instances by the term "about".

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth) acrylic acid" means methacrylic acid and/or acrylic acid.

As used herein, the term "(meth)acrylamide" means methacrylamides and/or acrylamides.

The indenonaphthopyran compounds of the present invention, as described herein, including, but not limited to, indenonaphthopyran compounds represented by Formula (I), in each case can optionally further include one or more coproducts, resulting from the synthesis of such compounds.

As used herein, the term "photochromic" and similar terms, such as "photochromic compound", means having an absorption spectrum for at least visible radiation that varies in response to absorption of at least actinic radiation. Further, as used herein, the term "photochromic material" means any substance that is adapted to display photochromic properties (such as adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state", to a second state, for example a "colored state", in response to actinic radiation, and reverting back to the first state in response to thermal energy. The term "non-thermally reversible photochromic compounds/materials" as used herein means compounds/materials capable of converting from a first state, for example a "clear state", to a second state, for example a "colored state", in response to actinic radiation, and reverting back to the first state in response to actinic radiation of substantially the same wavelength(s) as the absorption(s) of the colored state.

As used herein, to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting embodiments disclosed herein, the photochromic compounds of the present invention can have a different absorption spectrum in each of the first and second state. For example, while not limiting herein, a photochromic compound of the present invention can be clear in the first state and colored in the second state. Alternatively, a photochromic compound of the present invention can have a first color in the first state and a second color in the second state.

As used herein, the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including, without limitation, contact lenses, intra-ocular lenses, magnifying lenses, and protective lenses or visors.

As used herein, the term "display" means the visible or machine-readable representation of information in words, numbers, symbols, designs or drawings. Non-limiting examples of display elements include screens, monitors, and security elements, such as security marks.

As used herein, the term "window" means an aperture adapted to permit the transmission of radiation therethrough. Non-limiting examples of windows include automotive and aircraft transparencies, windshields, filters, shutters, and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, spatial or directional terms, such as "left", "right", "inner", "outer", "above", "below", and the like, relate to the invention as it is depicted. It is to be understood, however, that the invention can assume various alternative orientations and, accordingly, such terms are not to be considered as limiting.

As used herein, the terms "formed over", "deposited over", "provided over", "applied over", residing over", or "positioned over", mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

As used herein, recitations relating to ring positions, such as, but not limited to, position-x (e.g., position-6 or position-7) means a particular position in the ring structure of the indenonaphthopyran compounds of the present invention, and which are depicted herein, in accordance with some embodiments, by numbers within the ring structures of representative chemical formulas, such as, but not limited to, Formula (I).

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include a methylene group or a methyl group; groups that are linear, such as linear $C_2$-$C_{25}$ alkyl groups; and groups that are appropriately branched, such as branched $C_3$-$C_{25}$ alkyl groups.

The term "alkyl" as used herein means linear or branched, cyclic or acyclic $C_1$-$C_{25}$ alkyl. Linear or branched alkyl can include $C_1$-$C_{25}$ alkyl, such as $C_1$-$C_{20}$ alkyl, such as $C_2$-$C_{10}$ alkyl, such as $C_1$-$C_{12}$ alkyl, such as $C_1$-$C_6$ alkyl. Examples of alkyl groups from which the various alkyl groups of the present invention can be selected from, include, but are not limited to, those recited further herein. Alkyl groups can include "cycloalkyl" groups. The term "cycloalkyl" as used herein means groups that are appropriately cyclic, such as, but not limited to, $C_3$-$C_{12}$ cycloalkyl (including, but not limited to, cyclic $C_3$-$C_{10}$ alkyl, or cyclic $C_5$-$C_7$ alkyl) groups. Examples of cycloalkyl groups include, but are not limited to, those recited further herein. The term "cycloalkyl" as used herein also includes: bridged ring polycycloalkyl groups (or bridged ring polycyclic alkyl groups), such as, but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "heterocycloalkyl" as used herein means groups that are appropriately cyclic, such as, but not limited to, $C_2$-$C_{12}$ heterocycloalkyl groups, such as $C_2$-$C_{10}$ heterocycloalkyl groups, such as $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, imidazolyl, tetrahydrofuranyl, tetrahydropyranyl and piperidinyl. The term "heterocycloalkyl" as used herein also includes: bridged ring polycyclic heterocycloalkyl groups, such as, but not limited to, 7-oxabicyclo[2.2.1]heptanyl; and fused ring polycyclic heterocycloalkyl groups, such as, but not limited to, octahydrocyclopenta[b]pyranyl, and octahydro-1H-isochromenyl.

As used herein, the term "aryl" and related terms, such as "aryl group", means an aromatic cyclic monovalent hydrocarbon radical. As used herein, the term "aromatic" and related terms, such as "aromatic group", means a cyclic conjugated hydrocarbon having stability (due to delocalization of pi-electrons) that is significantly greater than that of a hypothetical localized structure. Examples of aryl groups include $C_6$-$C_{14}$ aryl groups, such as, but not limited to, phenyl, naphthyl, phenanthryl, and anthracenyl.

The term "heteroaryl", as used herein, includes, but is not limited to, $C_3$-$C_{18}$ heteroaryl, such as, but not limited to, $C_3$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups include, but are not limited to, furanyl, pyranyl, pyridinyl, quinolinyl, isoquinolinyl, and pyrimidinyl.

The term "aralkyl", as used herein, includes, but is not limited to, $C_6$-$C_{24}$ aralkyl, such as, but not limited to, $C_6$-$C_{10}$ aralkyl, and means an alkyl group substituted with an aryl group. Examples of aralkyl groups include, but are not limited to, benzyl and phenethyl.

Representative alkyl groups include, but are not limited to, methyl, ethyl, propyl, isopropyl, butyl, isobutyl, sec-butyl, tert-butyl, pentyl, neopentyl, hexyl, heptyl, octyl, nonyl and decyl. Representative alkenyl groups include, but are not limited to, vinyl, allyl, and propenyl. Representative alkynyl groups include, but are not limited to, ethynyl, 1-propynyl, 2-propynyl, 1-butynyl, and 2-butynyl. Representative cycloalkyl groups include, but are not limited to, cyclopropyl, cyclobutyl, cyclopentyl, cyclohexyl, and cyclooctyl.

The term "nitrogen-containing heterocycle", such as "nitrogen-containing heterocycle group" or nitrogen-containing heterocycle substituent", as used herein, includes, but is not limited to, a nitrogen-containing ring in which the nitrogen-containing ring is bonded through a ring nitrogen. Examples of nitrogen-containing heterocycles include, but are not limited to, cyclic aminos, such as morpholino, piperidino, pyrrolidino, and decahydroisoquinolino; and heteroaromatics, such as imidazole, pyrrole, indole, and carbazole.

As used herein, recitations of "substituted" group, means a group including, but not limited to, alkyl group, heterocycloalkyl group, aryl group, and/or heteroaryl group, in which at least one hydrogen thereof has been replaced or substituted with a group that is other than hydrogen, such as, but not limited to: alkoxy groups; halo groups (e.g., F, Cl, I, and Br); hydroxyl groups; thiol groups; alkylthio groups; arylthio groups; ketone groups; aldehyde groups; ester groups; carboxylic acid groups; phosphoric acid groups; phosphoric acid ester groups; sulfonic acid groups; sulfonic acid ester groups; nitro groups; cyano groups; alkyl groups (including aralkyl groups); alkenyl groups; alkynyl groups; haloalkyl groups; perhaloalkyl groups; heterocycloalkyl groups; aryl groups (including alkaryl groups, including hydroxyl substituted aryl, such as phenol, and including poly-fused-ring aryl); heteroaryl groups (including poly-fused-ring heteroaryl groups); amino groups, such as $—N(R^{11'})(R^{12'})$ where $R^{11'}$ and $R^{12'}$ are each independently selected from, for example, hydrogen, alkyl, heterocycloalkyl, aryl, or heteroaryl; carboxylate groups; siloxane groups; alkoxysilane groups; polysiloxane groups; amide groups; carbamate groups; carbonate groups; urea groups; polyester groups; polyether groups; polycarbonate groups; polyurethane groups; trialkylsilyl groups; vinylphenyl groups; acrylate groups; methacrylate groups; acrylamide groups; methacrylamide groups; nitrogen-containing heterocycles; or combinations thereof, including those classes and examples as described further herein. In accordance with some embodiments of the present invention, the substituents of a substituted group are more particularly recited.

As used herein, the term "halo" and related terms, such as "halo group", "halo substituent", "halogen group", and "halogen substituent", means a single bonded halogen group, such as —F, —Cl, —Br, and —I.

As used herein, recitations of "halo substituted" and related terms (such as, but not limited to, haloalkyl groups, haloalkenyl groups, haloalkynyl groups, haloaryl groups, and halo-heteroaryl groups) means a group in which at least one, and up to and including all of the available hydrogen groups thereof, is substituted with a halo group, such as, but not limited to F, Cl or Br. The term "halo-substituted" is inclusive of "perhalo-substituted". As used herein, the term perhalo-substituted group and related terms (such as, but not limited to, perhaloalkyl groups, perhaloalkenyl groups, perhaloalkynyl groups, perhaloaryl groups or perhalo-heteroaryl groups) means a group in which all of the available hydrogen groups thereof are substituted with a halo group.

For purposes of non-limiting illustration: perhalomethyl is $—CX_3$; and perhalophenyl is $—C_6X_5$, where X represents one or more halo groups, such as, but not limited to F, Cl, Br, or I.

As used herein, "at least one of" is synonymous with "one or more of", whether the elements are listed conjunctively or disjunctively. For example, the phrases "at least one of A, B, and C" and "at least one of A, B, or C" each mean any one of A, B, or C, or any combination of any two or more of A, B, or C. For example, A alone; or B alone; or C alone; or A and B; or A and C; or B and C; or all of A, B, and C.

As used herein, "selected from" is synonymous with "chosen from" whether the elements are listed conjunctively or disjunctively. Further, the phrases "selected from A, B, and C" and "selected from A, B, or C" each mean any one of A, B, or C, or any combination of any two or more of A, B, or C. For example, A alone; or B alone; or C alone; or A and B; or A and C; or B and C; or all of A, B, and C.

The discussion of the present invention herein may describe certain features as being "particularly" or "preferably" within certain limitations (e.g., "preferably", "more preferably", or "even more preferably", within certain limitations). It is to be understood that the invention is not limited to or by such particular or preferred limitations, but encompasses the entire scope of the disclosure.

As used herein, and in accordance with some embodiments, the term "trialkylsilyl" such as with regard to groups, and substituents of various groups, of the photochromic compounds of the present invention, and related terms, such as "trialkylsilyl group(s)" and "trialkylsilyl substituent(s)" means a group represented by the following general formula-$Si(R^c)(R^d)(R^e)$, where $R^c$, $R^d$, and $R^e$ are each independently selected from alkyl, including those classes and examples of alkyl as recited previously herein, such as $C_1$-$C_{10}$ alkyl or $C_1$-$C_8$ alkyl. With some embodiments of the present invention, $R^c$, $R^d$, and $R^e$ are each methyl, and the trialkylsilyl group is a trimethylsilyl group. With some further embodiments of the present invention, the Si of the trialkylsilyl group is not bonded directly to a heteroatom, such as O, S, or N.

As used herein, and in accordance with some embodiments, the term "(meth)acrylate" such as with regard to groups, and substituents of various groups, of the photochromic compounds of the present invention, and related terms, such as "(meth)acrylate group" and "(meth)acrylate substituent", includes a material represented by $—O—C(O)—C(R')=CH_2$, where R' is hydrogen or methyl.

As used herein, and in accordance with some embodiments, the term "(meth)acrylamide" such as with regard to groups, and substituents of various groups, of the photochromic compounds of the present invention, and related terms, such as "(meth)acrylamide group" and "(meth)acrylamide substituent", includes, with some embodiments, a material represented by $—N(R'')—C(O)—C(R')=CH_2$, where: R' is hydrogen or methyl; and R" is a group R as described below.

As used herein, and in accordance with some embodiments, the term "vinylphenyl" such as with regard to groups, and substituents of various groups, of the photochromic compounds of the present invention, and related terms, such as "vinylphenyl group" and "vinylphenyl substituent", includes a material represented by the following general formula,

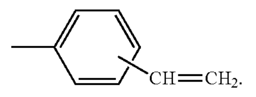

As used herein, and in accordance with some embodiments, the term "ketone" such as with regard to groups, and substituents of various groups, of the photochromic compounds of the present invention, and related terms, such as "ketone group" and "ketone substituent", includes a material represented by —C(O)R, where R is selected from those groups as described below, other than hydrogen.

As used herein, and in accordance with some embodiments, the term "carboxylic acid" such as with regard to groups, and substituents of various groups, of the photochromic compounds of the present invention, and related terms, such as "carboxylic acid group" and "carboxylic acid substituent" includes a material represented by —C(O) OH.

As used herein, and in accordance with some embodiments, the term "ester" such as with regard to groups, and substituents of various groups, of the photochromic compounds of the present invention, and related terms, such as "ester group" and "ester substituent" means a carboxylic acid ester group represented by —C(O) OR, where R is selected from those groups as described below, other than hydrogen.

As used herein, and in accordance with some embodiments, the term "carboxylate" such as with regard to groups, and substituents of various groups, of the photochromic compounds of the present invention, and related terms, such as "carboxylate group" and "carboxylate substituent", includes a material represented by —OC(O)R, where R is selected from those groups as described below.

As used herein, and in accordance with some embodiments, the term "amide" such as with regard to groups, and substituents of various groups, of the photochromic compounds of the present invention, and related terms, such as "amide group" and "amide substituent" includes a material represented by —C(O)N(R)(R) or —N(R)C(O)R, where each R is independently selected from those groups as described below.

As used herein, and in accordance with some embodiments, the term "carbonate" such as with regard to groups, and substituents of various groups, of the photochromic compounds of the present invention, and related terms, such as "carbonate group" and "carbonate substituent" includes a material represented by —OC(O)OR, where R is selected from those groups as described below, other than hydrogen.

As used herein, and in accordance with some embodiments, the term "carbamate" such as with regard to groups, and substituents of various groups, of the photochromic compounds of the present invention, and related terms, such as "carbamate group" and "carbamate substituent" includes a material represented by —OC(O)N(R)(H) or —N(H)C(O) OR, where R in each case is independently selected from those groups as described below, other than hydrogen.

As used herein, and in accordance with some embodiments, the term "urea" such as with regard to groups, and substituents of various groups, of the photochromic compounds of the present invention, and related terms, such as "urea group" and "urea substituent" includes a material represented by —N(R)C(O)N(R)(R), where each R is independently selected from those groups as described below.

As used herein, and in accordance with some embodiments, the term "siloxy" such as with regard to groups, and substituents of various groups, of the photochromic compounds of the present invention, and related terms, such as "siloxy group" and "siloxy substituent" includes a material represented by —O—$Si(R)_3$ where each R is independently selected from those groups as described below, other than hydrogen.

As used herein, and in accordance with some embodiments, the term "alkoxysilane" such as with regard to groups, and substituents of various groups, of the photochromic compounds of the present invention, and related terms, such as "alkoxysilane group" and alkoxysilane substituent" includes a material represented by —$Si(OR'')_w(R)_t$, where w is 1 to 3 and t is 0 to 2, provided the sum of w and t is 3; R" for each w is independently selected from alkyl; and R for each t is independently selected from those groups as described below, other than hydrogen.

As used herein, and in accordance with some embodiments, the term "polysiloxane" such as with regard to groups, and substituents of various groups, of the photochromic compounds of the present invention, and related terms, such as "polysiloxane group" and "polysiloxane substituent", includes a material represented by the following Formula (A):

(A)

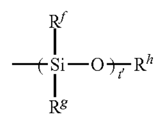

With reference to Formula (A): t' is greater than or equal to 2, such as from 2 to 200; $R^f$ and $R^g$ for each t' are each independently selected from a group R as described below, other than hydrogen; and Rh is independently a group R as described below.

Unless otherwise stated, each R group of each of the above described (meth)acrylamide, ketone, ester (carboxylic acid ester), carboxylate, amide, carbonate, carbamate, urea, siloxane, alkoxysilane groups, and polysiloxane groups, is in each case independently selected from hydrogen, alkyl, haloalkyl, perhaloalkyl, cycloalkyl, heterocycloalkyl, aryl, heteroaryl, and combinations thereof (including those classes and examples thereof as recited previously herein).

The indenonaphthopyran compounds according to the present invention, such as, but not limited to, those represented by Formula (I), and the various groups thereof, are described in further detail herein as follows.

With some embodiments of the present invention and with reference to Formula (I), $R^5$ and $R^6$ together form a spirocyclic ring. With some further embodiments, $R^5$ and $R^6$ together form a spirocyclic ring that is fully carbocyclic (containing only carbon atoms in the spirocyclic ring), such as a $C_3$-$C_{10}$ spirocyclic ring, or a $C_5$ to $C_8$ spirocyclic ring. With some additional embodiments, $R^5$ and $R^6$ together form an unsubstituted spirocyclic ring.

With reference to Formula (I): m is from 0 to 3 (such as 0, 1, 2, or 3); n is from 0 to 3 (such as 0, 1, 2, or 3); p is 1 or 2; and q is from 0 to 4 (such as 0, 1, 2, 3, or 4). With further reference to Formula (I), and for purposes of non-limiting illustration: when subscript m is less than 3 (including 0), a hydrogen (—H) is bonded to each position to which an $R^1$ is not bonded; when m is 3, a hydrogen (—H) is bonded to a single position to which the three $R^1$ groups are not bonded; when subscript n is less than 3 (including 0), a hydrogen (—H) is bonded to each position to which an $R^2$ is not bonded; when n is 3, a hydrogen (—H) is bonded to a single position to which the three $R^2$ groups are not bonded; when subscript q is less than 4, a hydrogen (—H) is bonded to each position to which an $R^4$ is not bonded; and when subscript q is 0, a hydrogen (—H) is bonded to each of positions 9, 10, 11, and 12.

With reference to Formula (I), and in accordance with some embodiments, $R^1$ independently for each m, $R^2$ independently for each n, $R^3$ independently for each p, and $R^4$ independently for each q, in each case is independently selected from: hydroxyl; cyano; (meth)acrylate or (meth) acrylamide; vinylphenyl; amino, or substituted nitrogen-containing heterocycle, or unsubstituted nitrogen-containing heterocycle; a halo group; a perhalo alkyl, or perhalo phenyl; substituted or unsubstituted alkyl; substituted or unsubstituted phenyl; substituted or unsubstituted alkoxy; ketone, aldehyde, carboxylic acid ester, carboxylic acid, carboxylate, or amide; carbonate, carbamate, carbonyl amino, or urea; polyether; siloxy, or alkoxysilane; trialkylsilyl; or combinations of two or more thereof.

With reference to Formula (I), and in accordance with some embodiments, $R^5$ and $R^6$ are each independently, substituted or unsubstituted alkyl, or trialkylsilyl.

With further reference to Formula (I), and in accordance with some embodiments, independently for each of $R^1$, $R^2$, $R^3$, $R^4$, $R^5$, and $R^6$, each nitrogen-containing heterocycle substituent, each alkyl substituent, each phenyl substituent, and each alkoxy substituent, are in each case independently selected from: halo; cyano; nitro; alkyl; alkenyl; alkynyl; haloalkyl; perhaloalkyl; heterocycloalkyl; phenyl; heteroaryl; hydroxyl; thiol; alkyl ether; alkyl thioether; phenyl ether; phenyl thioether; ketone; aldehyde; carboxylic acid ester; carboxylic acid; carboxylate; siloxane; alkoxysilane; amide; amino; nitrogen-containing heterocycle; alkyl amine; phenyl amine; carbamate; carbonate; urea; polyether group; trialkylsilyl; an acrylate group; a methacrylate group; an acrylamide group; a methacrylamide group; a vinylphenyl group; combinations thereof; or two or more thereof.

With some embodiments of the present invention, and with reference to Formula (I): m is at least one, and one $R^1$ is trialkylsilyl; and p is 2.

In accordance with some embodiments of the indenonaphthopyran compounds of the present invention, and with reference to Formula (I), $R^3$ independently for each p is selected from: alkoxy; amino; unsubstituted nitrogen-containing heterocycle; or substituted nitrogen-containing heterocycle, where each substituent of the substituted nitrogen-containing heterocycle independently comprises acrylate, methacrylate, acrylamide, or methacrylamide.

In accordance with some embodiments of the indenonaphthopyran compounds of the present invention, and with reference to Formula (I): p is 2; $R^3$ at position-6 is alkoxy; and $R^3$ at position-7 is selected from, amino, unsubstituted nitrogen-containing heterocycle, or substituted nitrogen-containing heterocycle, where each substituent of the substituted nitrogen-containing heterocycle independently includes acrylate, methacrylate, acrylamide, or methacrylamide.

In accordance with some further embodiments of the indenonaphthopyran compounds of the present invention, and with reference to Formula (I): p is 2; $R^3$ at postion-6 is alkoxy; and $R^3$ at position-7 is selected from unsubstituted nitrogen-containing heterocycle selected from piperidinyl, decahydroisoquinolinyl, or decahydroquinolinyl, or substituted nitrogen-containing heterocycle selected from substituted piperidinyl, substituted decahydroisoquinolinyl, or substituted decahydroquinolinyl, wherein each substituent of the substituted nitrogen-containing heterocycle independently includes acrylate, methacrylate, acrylamide, or methacrylamide.

In accordance with some additional embodiments of the indenonaphthopyran compounds of the present invention, and with reference to Formula (I): m is at least 1, and one $R^1$ is selected from trialkylsilyl group; or q is at least 1, and $R^4$ at position-11 is selected from trialkylsilyl group, or trialkylsilyl mono-substituted phenyl group.

With some embodiments of the indenonaphthopyran compounds of the present invention, and with reference to Formula (I): (A) m is at least 1, and one $R^1$ is represented by one of the following Formula (V) or Formula (VI).

Formula (V), of which one $R^1$ can be represented, is provided as follows:

(V)

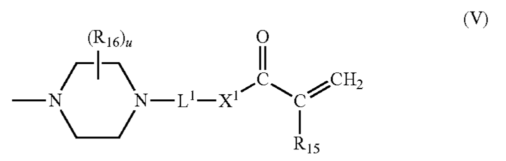

With reference to Formula (V), $R_{15}$ is hydrogen or methyl, $X^1$ is O or NH, u is 0 to 4, $R_{16}$ independently for each u is alkyl or cycloalkyl, and $L^1$ is divalent alkyl, or a divalent group represented by the following Formula (Va), (Va)

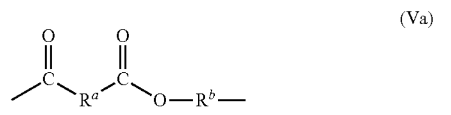

With reference to Formula (Va), $R^a$ and $R^b$ are each independently selected from divalent alkyl. With reference to Formula (V), and with some embodiments, $L^1$ is divalent $C_1$-$C_6$ alkyl. With reference to Formula (Va), and in accordance with some embodiments, $R^a$ and $R^b$ are each independently selected from divalent $C_1$-$C_6$ alkyl.

Formula (VI), from which one $R^1$ is alternatively represented, is provided as follows:

(VI)

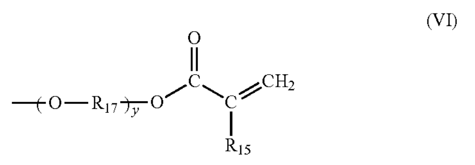

With reference to Formula (VI), $R_{15}$ is hydrogen or methyl, y is 1 to 20, and $R_{17}$ independently for each y is divalent alkyl. With further reference to Formula (VI), and in accordance with some embodiments, $R_{17}$ independently for each y is divalent $C_2$-$C_6$ alkyl.

With some further embodiments of the indenonaphthopyran compounds of the present invention, alternatively to (A) as described above, and with reference to Formula (I): (B) p is at least 1, and $R^3$ at position-7 is represented by the following Formula (VII), (VII)

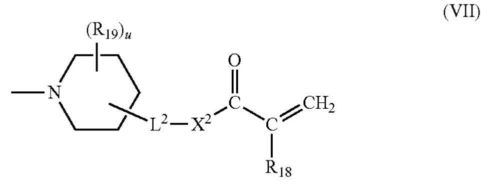

With reference to Formula (VII), $R_{18}$ is hydrogen or methyl, $X^2$ is O or NH, $L^2$ is a single bond or divalent alkyl, u is 0 to 4, and $R_{19}$ independently for each u is alkyl or cycloalkyl. With some embodiments, $L^2$ of Formula (VII) is a single bond or divalent $C_1$-$C_6$ alkyl. With further embodiments, $R_{19}$ of Formula (VII) independently for each u is $C_1$-$C_6$ alkyl or $C_5$-$C_7$ cycloalkyl.

In accordance with some embodiments of the indenonaphthopyran compounds of the present invention, and with reference to Formula (I): m is at least one, and one $R^1$ is trialkylsilyl; and p is 2, $R^3$ at position-6 is alkoxy, and $R^3$ at position-7 is represented by the following Formula (VII), (VII)

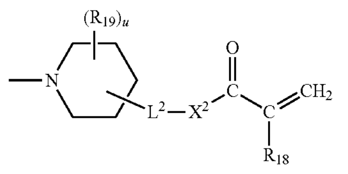

With reference to Formula (VII), $R_{18}$ is hydrogen or methyl, $X^2$ is O or NH, $L^2$ is a single bond or divalent alkyl, u is 0 to 4, and $R_{19}$ independently for each u is alkyl or cycloalkyl. With some embodiments, $L^2$ of Formula (VII) is a single bond or divalent $C_1$-$C_6$ alkyl. With further embodiments, $R_{19}$ of Formula (VII) independently for each u is $C_1$-$C_6$ alkyl or $C_5$-$C_7$ cycloalkyl.

With some embodiments of the indenonaphthopyran compounds of the present invention, such as represented by Formula (I), each trialkylsilyl group is a trimethylsilyl group.

Non-limiting examples of indenonaphthopyran compounds according to the present invention are represented by the following Formulas (I-1), (I-2), (I-3), and (I-4).

Formula (I-1)

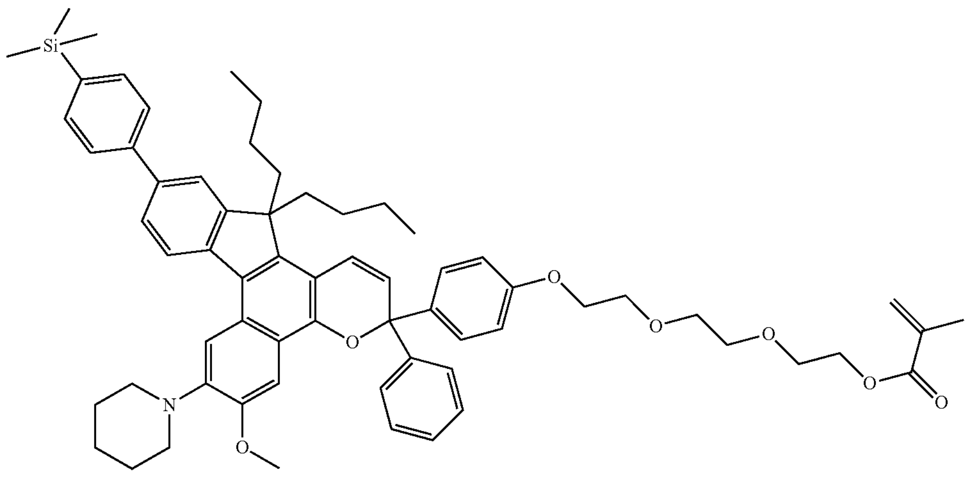

Formula (I-2)

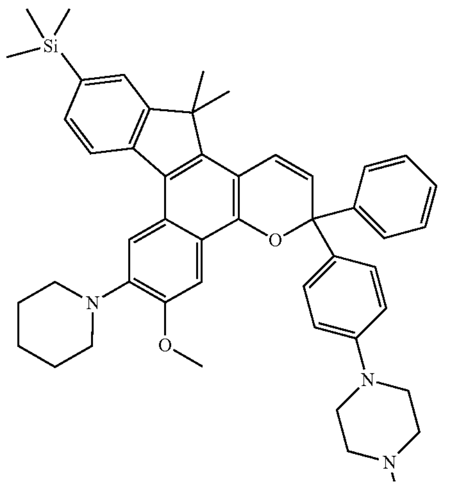

-continued

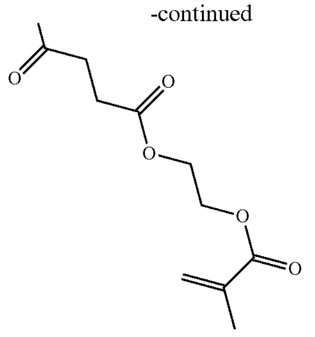

Formula (I-3)

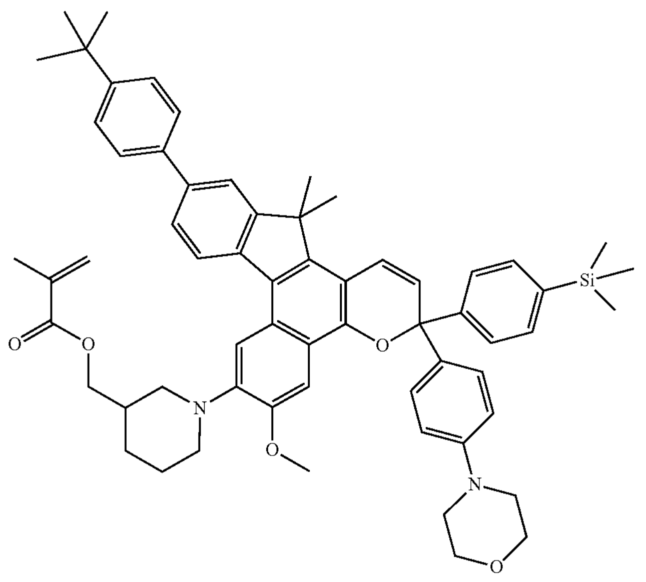

Formula (I-4)

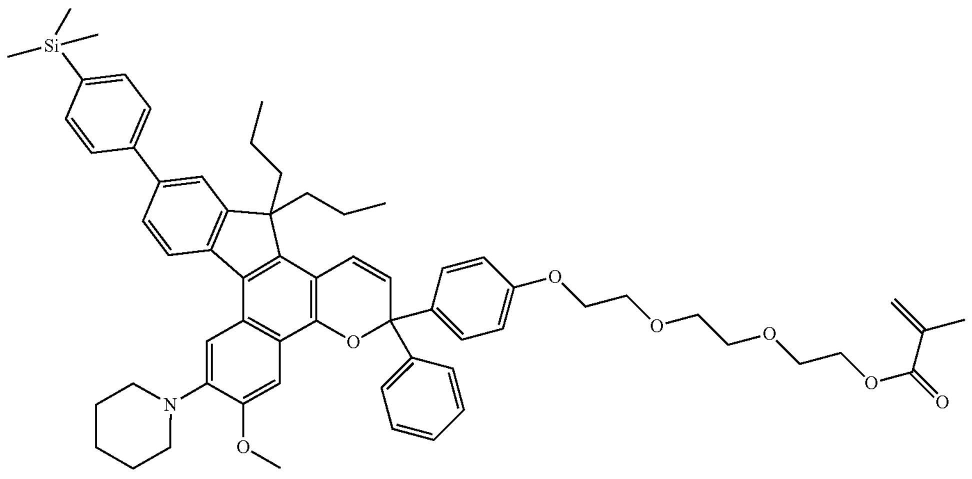

The indenonaphthopyran compounds according to the present invention can be prepared in accordance with art-recognized methods. With some embodiments, the indenonaphthopyran compounds according to the present invention are prepared in accordance with the synthetic procedures as described in the Examples further herein.

The indenonaphthopyran compound of the present invention is, with some embodiments, a photochromic indenonaphthopyran compound. In accordance with the present invention there is also provided a photochromic composition, which includes at least one indenonaphthopyran compound according to the present invention, which is a photochromic indenonaphthopyran compound, such as represented by Formula (I).

In accordance with some embodiments of the present invention, the photochromic composition includes: (i) a matrix forming material, in which the matrix forming material is at least one of a polymeric material, an oligomeric material, and/or a monomeric material; and (ii) the indenonaphthopyran compound according to the present invention, which is a photochromic indenonaphthopyran compound, such as represented by Formula (I).

With some embodiments, the photochromic composition is a polymerizable photochromic composition, and the matrix forming material includes one or more reactive groups that are capable of forming covalent bonds with the ethylenically unsaturated radically polymerizable group(s) of the indenonaphthopyran compound of the present invention. With some further embodiments, the matrix forming material of the polymerizable photochromic composition includes at least one ethylenically unsaturated radically polymerizable group selected from, for example, vinylphenyl, acrylate, methacrylate, acrylamide, or methacrylamide.

With some embodiments, examples of monomers of the polymerizable photochromic compositions include, but are not limited to, vinylphenyl monomer(s), acrylate monomers, methacrylate monomers, acrylamide monomers, methacrylamide monomers, or combinations of two or more thereof. The monomers of the polymerizable photochromic compositions include, with some embodiments, two or more (such as 2 to 6) ethylenically unsaturated radically polymerizable groups, where each ethylenically unsaturated radically polymerizable group is independently selected from for example, vinylphenyl, acrylate, methacrylate, acrylamide, or methacrylamide.

With some embodiments, examples of polymers of the polymerizable photochromic compositions include, but are not limited to: poly(carbonate); copolymers of ethylene and vinyl acetate; copolymers of ethylene and vinyl alcohol; copolymers of ethylene, vinyl acetate, and vinyl alcohol (such as those that result from the partial saponification of copolymers of ethylene and vinyl acetate); cellulose acetate butyrate; poly(urethane); poly(acrylate); poly(methacrylate); epoxies; poly(anhydride); poly(urea urethane); N-alkoxymethyl (meth)acrylamide functional polymers; poly(siloxane), or polysiloxane; poly(silane), or polysilane; and combinations and mixtures thereof. Further classes and examples of polymeric materials that can be used with the photochromic compositions of the present invention include, but are not limited to, those disclosed at column 39, line 45 through column 40, line 67 of U.S. Pat. No. 9,028,728 B2, which disclosure is specifically incorporated herein by reference. Non-limiting examples of oligomers of the polymerizable photochromic compositions of the present invention include oligomeric versions (or oligomers) of the above recited polymers.

In accordance with some embodiments of the present invention, the matrix forming material of the polymerizable photochromic composition includes one or more polysiloxanes having at least one ethylenically unsaturated radically polymerizable group selected from, for example, vinylphenyl, acrylate, methacrylate, acrylamide, and/or methacrylamide. Classes of polysiloxanes that can be included in the photochromic compositions of the present invention include, polydialkylsiloxanes having at least one ethylenically unsaturated radically polymerizable group selected from, for example, vinylphenyl, acrylate, methacrylate, acrylamide, and/or methacrylamide. With some embodiments, the polydialkylsiloxane of the polymerizable photochromic compositions of the present invention is selected from polydimethylsiloxanes having at least one ethylenically unsaturated radically polymerizable group selected from, for example, vinylphenyl, acrylate, methacrylate, acrylamide, and/or methacrylamide.

The polymerizable photochromic composition, with some embodiments of the present invention includes a polydimethylsiloxane having at least one ethylenically unsaturated radically polymerizable group selected from acrylate, methacrylate, or combinations thereof, which is also referred to herein as a (meth)acrylate functional polydimethylsiloxane. Examples of suitable (meth)acrylate functional polydimethylsiloxanes include, but are not limited to, monomethacryloxypropyl terminated polydimethylsiloxanes and methacryloxypropyl terminated polydimethylsiloxanes, such as those commercially available from Gelest, Inc.

In accordance with some embodiments, the polymerizable photochromic composition of the present invention, in addition to one or more indenonaphthopyran compounds represented by Formula (I), includes (meth)acrylate functional polydimethylsiloxane.

With some further embodiments, the photochromic composition of the present invention further includes at least one of a complementary photochromic material (including one or more of those other photochromic materials and compounds described further herein), a photoinitiator, a thermal initiator, a polymerization inhibitor, a solvent, a light stabilizer, a heat stabilizer, a mold release agent, a rheology control agent, a leveling agent, a free radical scavenger, and/or an adhesion promoter.

Classes of other photochromic compounds that can be used in combination with the indenonaphthopyran compounds of the present invention include, but are not limited to, thermally reversible photochromic compounds, non-thermally reversible photochromic compounds, and mixtures or combinations thereof. Examples of classes of other photochromic compounds that can be used in combination with the indenonaphthopyran compounds of the present invention, include, but are not limited to, indeno-fused naphthopyrans, naphtho[1,2-b]pyrans, naphtho[2,1-b]pyrans, spirofluoroeno[1,2-b]pyrans, phenanthrenopyrans, quinolinopyrans, fluoroanthenopyrans, spiropyrans, benzoxazines, naphthoxazines, spiro(indoline) naphthoxazines, spiro(indoline) pyridobenzoxazines, spiro(indoline) fluoranthenoxazines, spiro(indoline) quinoxazines, fulgides, fulgimides, diarylethenes, diarylalkylethenes, diarylalkenylethenes, and mixtures thereof. Further examples of other photochromic compounds that can be used in combination with the indenonaphthopyran compounds of the present invention include, but are not limited to, those disclosed at column 34, line 20 through column 35, line 13 of U.S. Pat. No. 9,028,728 B2, which disclosure is specifically incorporated by reference herein.

With some embodiments, the polymerizable photochromic composition of the present invention is a polymerizable (or curable) photochromic coating composition. Polymerizable (or curable) photochromic coating compositions according to the present invention can, with some embodiments, optionally include one or more additives such as waxes for flow and wetting, flow control agents, e.g., poly(2-ethylhexyl) acrylate, adjuvant resin to modify and optimize coating properties, antioxidants and ultraviolet (UV) light absorbers. Examples of useful antioxidants and UV light absorbers include those available commercially from BASF under the trademarks IRGANOX and TINUVIN. These optional additives, when used, are typically present in amounts up to 20 percent by weight (e.g., from 0.5 to 10 percent by weight), based on total weight of resin solids of the curable photochromic coating composition.

Photochromic compositions, photochromic articles and photochromic coating compositions according to the present invention can, with some embodiments, further include art-recognized additives that aid or assist in the processing and/or performance of the compositions or articles. Non-limiting examples of such additives include photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, adhesion promoters (such as hexanediol diacrylate and coupling agents), and combinations and mixtures thereof.

The photochromic indenonaphthopyran compounds of the present invention can be used in amounts (or ratios) such that the compositions, matrix material (such as an organic material), or substrate (e.g., photochromic articles and photochromic coatings) into which the photochromic compounds are incorporated or otherwise connected exhibits desired optical properties. With some embodiments, the amount and types of photochromic material can be selected such that the composition, matrix material, organic material, or substrate is clear or colorless when the photochromic compound is in the closed-form (e.g., in the bleached or unactivated state), and can exhibit a desired resultant color when the photochromic compound (such as a photochromic indenonaphthopyran compounds of the present invention) is in the open-form (e.g., when activated by actinic radiation). The precise amount of the indenonaphthopyran compound that is utilized in the various photochromic compositions and articles described herein is not critical provided that a sufficient amount is used to produce the desired effect. The particular amount of the photochromic material used can depend on a variety of factors, such as, but not limited to, the absorption characteristics of the photochromic compound, the color and intensity of the color desired upon activation, and the method used to incorporate or connect the photochromic material to the substrate. Photochromic compositions according to some embodiments of the present invention can include the indenonaphthopyran compound according to the present invention, such as the compounds represented by Formula (I), in an amount of from 0.01 to 40 weight percent, or from 0.05 to 15, or from 0.1 to 5 weight percent, based on the weight of the photochromic composition. For purposes of further non-limiting illustration, the amount of the indenonaphthopyran compound/material, such as the compounds represented by Formula (I), that is incorporated into an organic (or matrix, or matrix forming) material can range from 0.01 to 40 weight percent, or from 0.05 to 15, or from 0.1 to 5 weight percent, based on the weight of the organic (or matrix, or matrix forming) material.

The present invention also relates to photochromic articles that include one or more indenonaphthopyran compounds according to the present invention, such as represented by Formula (I). The photochromic articles are, with some embodiments, prepared by art-recognized methods, such as by imbibition methods, cast-in-place methods, coating methods, in-mold coating methods, over-mold methods, and lamination methods.

With some embodiments, the photochromic articles are selected from ophthalmic articles, display articles, windows, mirrors, and active liquid crystal cell articles, and passive liquid crystal cell articles.

In accordance with some further embodiments, the photochromic articles of the present invention are ophthalmic articles, and the ophthalmic articles are selected from corrective lenses, non-corrective lenses, contact lenses, intraocular lenses, magnifying lenses, protective lenses, and visors.

With some additional embodiments, the photochromic articles of the present invention are display articles, and the display articles are selected from screens, monitors, and security elements.

The present invention can be further characterized by one or more of the following non-limiting clauses.

Clause 1: An indenonaphthopyran compound represented by the following Formula (I), (I)

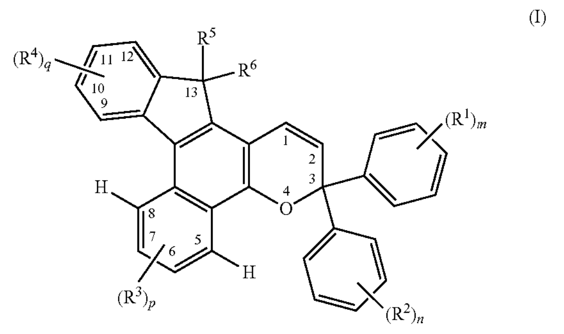

wherein, m is from 0 to 3, n is from 0 to 3, p is 1 or 2, q is from 0 to 4, $R^1$ independently for each m, $R^2$ independently for each n, $R^3$ independently for each p, and $R^4$ independently for each q, in each case is independently, hydroxyl;

cyano;

(meth)acrylate or (meth)acrylamide;

vinylphenyl;

amino, or substituted nitrogen-containing heterocycle, or unsubstituted nitrogen-containing heterocycle;

a halo group;

a perhalo alkyl, or a perhalo aryl;

substituted or unsubstituted alkyl;

substituted or unsubstituted alkenyl;

substituted or unsubstituted alkynyl;

substituted or unsubstituted heterocycloalkyl;

substituted or unsubstituted aryl;

substituted or unsubstituted heteroaryl;

substituted or unsubstituted alkoxy or substituted or unsubstituted aryloxy;

substituted or unsubstituted alkylthio or substituted or unsubstituted arylthio;

ketone, aldehyde, carboxylic acid ester, carboxylic acid, carboxylate, or amide;

carbonate, carbamate, carbonyl amino, or urea;

polyether, polyester, polycarbonate, or polyurethane;

siloxy, alkoxysilane, or polysiloxane;

trialkylsilyl; or combinations thereof; and $R^5$ and $R^6$ are each independently, substituted or unsubstituted alkyl;

substituted or unsubstituted aryl;

polyether, polyester, polycarbonate, or polyurethane;

trialkylsilyl; or $R^5$ and $R^6$ together form a spirocyclic ring, wherein each nitrogen-containing heterocycle substituent, each alkyl substituent, each alkenyl substituent, each alkynyl substituent, each heterocycloalkyl substituent, each aryl substituent, each heteroaryl substituent, each alkoxy substituent, each aryloxy substituent, each alkylthio substituent, and each arylthio substituent, are in each case independently selected from, halo, cyano, nitro, alkyl, alkenyl, alkynyl, haloalkyl, perhaloalkyl, heterocycloalkyl, aryl, heteroaryl, hydroxyl, thiol, alkyl ether, alkyl thioether, aryl ether, aryl thioether, ketone, aldehyde, carboxylic acid ester, carboxylic acid, carboxylate, siloxane, alkoxysilane, polysiloxane, amide, amino, nitrogen-containing heterocycle, alkyl amine, aryl amine, carbamate, carbonate, urea, polyester group, polyether group, polycarbonate group, polyurethane group, trialkylsilyl, an acrylate group, a methacrylate group, an acrylamide group, a methacrylamide group, a vinylphenyl group, combinations thereof, or two or more thereof, provided that said indenonaphthopyran compound comprises, (i) at least one trialkylsilyl group, and (ii) at least one ethylenically unsaturated radically polymerizable group selected from vinylphenyl, acrylate, methacrylate, acrylamide, or methacrylamide.

Clause 2: The indenonaphthopyran compound of clause 1 wherein, $R^1$ independently for each m, $R^2$ independently for each n, $R^3$ independently for each p, and $R^4$ independently for each q, in each case is independently, hydroxyl;

cyano;

(meth)acrylate or (meth)acrylamide;

vinylphenyl;

amino, or substituted nitrogen-containing heterocycle, or unsubstituted nitrogen-containing heterocycle;

a halo group;

a perhalo alkyl, or perhalo phenyl;

substituted or unsubstituted alkyl;

substituted or unsubstituted phenyl;

substituted or unsubstituted alkoxy;

ketone, aldehyde, carboxylic acid ester, carboxylic acid, carboxylate, or amide;

carbonate, carbamate, carbonyl amino, or urea;

polyether;

siloxy, or alkoxysilane;

trialkylsilyl; or combinations thereof; and $R^5$ and $R^6$ are each independently, substituted or unsubstituted alkyl, or trialkylsilyl;

wherein each nitrogen-containing heterocycle substituent, each alkyl substituent, each phenyl substituent, and each alkoxy substituent, are in each case independently selected from, halo, cyano, nitro, alkyl, alkenyl, alkynyl, haloalkyl, perhaloalkyl, heterocycloalkyl, phenyl, heteroaryl, hydroxyl, thiol, alkyl ether, alkyl thioether, phenyl ether, phenyl thioether, ketone, aldehyde, carboxylic acid ester, carboxylic acid, carboxylate, siloxane, alkoxysilane, amide, amino, nitrogen-containing heterocycle, alkyl amine, phenyl amine, carbamate, carbonate, urea, polyether group, trialkylsilyl, an acrylate group, a methacrylate group, an acrylamide group, a methacrylamide group, a vinylphenyl group, combinations thereof, or two or more thereof, provided that said indenonaphthopyran compound comprises, (i) at least one trialkylsilyl group, and (ii) at least one ethylenically unsaturated radically polymerizable group selected from vinylphenyl, acrylate, methacrylate, acrylamide, or methacrylamide.

Clause 3: The indenonaphthopyran compound of clauses 1 or 2 wherein:

m is at least one, and one $R^1$ is trialkylsilyl; and p is 2.

Clause 4: The indenonaphthopyran compound of any one of clauses 1 to 3 wherein, $R^3$ independently for each p is selected from, alkoxy, amino, unsubstituted nitrogen-containing heterocycle, or substituted nitrogen-containing heterocycle, wherein each substituent of the substituted nitrogen-containing heterocycle independently comprises acrylate, methacrylate, acrylamide, or methacrylamide.

Clause 5: The indenonaphthopyran compound of any one of clauses 1 to 4 wherein, p is 2, $R^3$ at postion-6 is alkoxy; and $R^3$ at position-7 is selected from, amino, unsubstituted nitrogen-containing heterocycle, or substituted nitrogen-containing heterocycle, wherein each substituent of the substituted nitrogen-containing heterocycle independently comprises acrylate, methacrylate, acrylamide, or methacrylamide.

Clause 6: The indenonaphthopyran compound of any one of clauses 1 to 5 wherein, $R^3$ at position-7 is selected from, unsubstituted nitrogen-containing heterocycle selected from piperidinyl, decahydroisoquinolinyl, or decahydroquinolinyl, or substituted nitrogen-containing heterocycle selected from substituted piperidinyl, substituted decahydroisoquinolinyl, or substituted decahydroquinolinyl, wherein each substituent of the substituted nitrogen-containing heterocycle independently comprises acrylate, methacrylate, acrylamide, or methacrylamide.

Clause 7: The indenonaphthopyran compound of any one of clauses 1 to 6 wherein one of:

m is at least 1, and one $R^1$ is selected from trialkylsilyl group;

or q is at least 1, and $R^4$ at position-11 is selected from trialkylsilyl group, or trialkylsilyl mono-substituted phenyl group.

Clause 8: The indenonaphthopyran compound of any one of clauses 1 to 7 wherein one of (A) or (B):

(A) m is at least 1, and one $R^1$ is represented by one of the following Formula (V) or Formula (VI), (V)

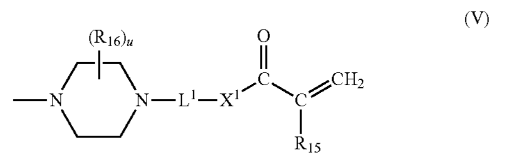

wherein for Formula (V), $R_{15}$ is hydrogen or methyl, $X^1$ is O or NH, u is 0 to 4, $R_{16}$ independently for each u is alkyl or cycloalkyl, and $L^1$ is divalent alkyl, or a divalent group represented by the following Formula (Va), (Va)

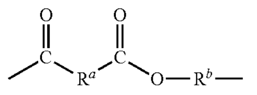

wherein for Formula (Va), $R^a$ and $R^b$ are each independently selected from divalent alkyl, or (VI)

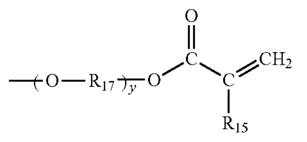

wherein for Formula (VI), $R_{15}$ is hydrogen or methyl, y is 1 to 20, and $R_{17}$ independently for each y is divalent alkyl;

or (B) p is at least 1, and $R^3$ at position-7 is represented by the following Formula (VII), (VII)

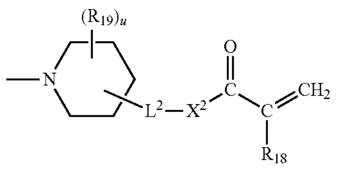

wherein for Formula (VII), $R_{18}$ is hydrogen or methyl, $X^2$ is O or NH, $L^2$ is a single bond or divalent alkyl, u is 0 to 4, and $R_{19}$ independently for each u is alkyl or cycloalkyl.

Clause 9: The indenonaphthopyran compound of any one of clauses 1 to 8 wherein:

p is 2, $R^3$ at position-6 is alkoxy, and $R^3$ at position-7 is unsubstituted nitrogen-containing heterocycle;

q is at least one, and $R^4$ at position-11 is trialkylsilyl or trialkylsilyl mono-substituted phenyl; and m is at least one, and one $R^1$ is represented by one of the following Formula (V) or Formula (VI), (V)

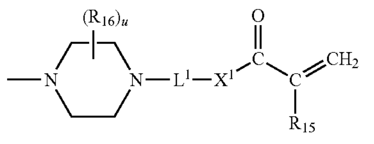

wherein for Formula (V), $R_{15}$ is hydrogen or methyl, $X^1$ is O or NH, u is 0 to 4, $R_{16}$ independently for each u is alkyl or cycloalkyl, and $L^1$ is divalent alkyl, or a divalent group represented by the following Formula (Va), (Va)

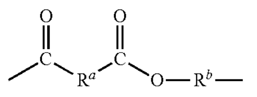

wherein for Formula (Va), $R^a$ and $R^b$ are each independently selected from divalent alkyl, or (VI)

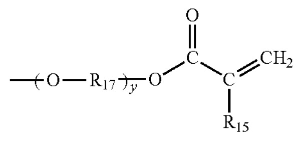

wherein for Formula (VI), $R_{15}$ is hydrogen or methyl, y is 1 to 20, and $R_{17}$ independently for each y is divalent alkyl.

Clause 10: The indenonaphthopyran compound of any one of clauses 1 to 9 wherein:

m is at least one, and one $R^1$ is trialkylsilyl; and p is 2, $R^3$ at position-6 is alkoxy, and $R^3$ at position-7 is represented by the following Formula (VII), (VII)

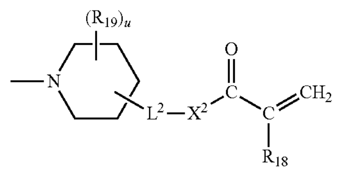

wherein for Formula (VII), $R_{18}$ is hydrogen or methyl, $X^2$ is O or NH, $L^2$ is a single bond or divalent alkyl, u is 0 to 4, and $R_{19}$ independently for each u is alkyl or cycloalkyl.

Clause 11: The indenonaphthopyran compound of any one of clauses 1 to 10, wherein each trialkylsilyl group is a trimethylsilyl group.

Clause 12: The indenonaphthopyran compound of clauses 1 or 2, wherein said indenonaphthopyran compound is selected from at least one indenonaphthopyran compound represented by Formulas (I-1), (I-2), (I-3), or (I-4), as described previously herein.

Clause 13: A photochromic composition comprising the indenonaphthopyran compound of any one of clauses 1 to 12.

Clause 14: The photochromic composition of clause 13, wherein said photochromic composition is a polymerizable photochromic composition further comprising (meth)acrylate functional polydimethylsiloxane.

Clause 15: A photochromic article comprising the indenonaphthopyran compound of any one of clauses 1 to 12, wherein the photochromic article is selected from the group consisting of ophthalmic articles, display articles, windows, mirrors, active liquid crystal cell articles, and passive liquid crystal cell articles.

Clause 16: The photochromic article of clause 15, wherein the photochromic article is selected from ophthalmic articles, and the ophthalmic articles are selected from corrective lenses, non-corrective lenses, contact lenses, intraocular lenses, magnifying lenses, protective lenses, and visors.

The present invention is more particularly described in the following examples, which are intended as illustrative only, since numerous modifications and variations therein will be apparent to those skilled in the art.

EXAMPLES

In Part-1 of the following examples there are provided descriptions of the synthetic preparation of comparative indenonaphthopyran compounds (Comparative Examples CE-1, CE-2, and CE-3) and indenonaphthopyran compounds according to the present invention (Examples 4, 5, and 6). In Part-2 there is provided a summary of an evaluation of the solubility of certain comparative indenonaphthopyrans and indenonaphthopyrans according to the present invention of Part-1, in a polymerizable polysiloxane-containing composition.

Part-1

Synthetic Descriptions

Comparative Example CE-1

A comparative indenonaphthopyran compound CE-1 was prepared in accordance with the following eight step synthetic procedure.

Step 1

To a dry 2 L single-neck round bottom flask was added 4-hydroxybenzophenone (218 g), potassium carbonate (230 g), ethylene chlorohydrin (200 g) and dimethyl sulfide (400 ml). The resulting slurry was heated to 110° C. for 24 hours under magnetic stirring, then cooled to 50° C. Water (600 ml) was added to the mixture. The slurry was extracted by chloroform (2×500 ml). The bottom layer was isolated and washed with water (500 ml), then dried over $Na_2SO_4$, filtered and condensed under reduced pressure. The resulting oily residue was dried in heated vacuum oven (70° C. for 24 hours). The product, 4-(2-(2-(2-hydroxyethoxy) ethoxy) ethoxy)benzophenone, was obtained as an oily residue and used as is in next step without further purification.

Step 2

The oily product from Step 1 was dissolved in anhydrous dichloromethane (500 ml) in a dry single-neck 2 L round bottom flask equipped with magnetic stirring. Solid camphosulfonic acid (2.2 g) was added, and the flask was cooled by ice bath (0° C.). Liquid 3,4-dihydro-2H-pyran (140 ml) was added over 30 minutes. The resulting mixture was stirred at 0° C. for 1 hour. Saturated Sodium bicarbonate (10 g in 500 ml water) was added to the mixture. The mixture was stirred for 5 minutes and then transferred to 2 L separation funnel. The bottom layer was isolated and dried over sodium sulfate. The solution was filtered and condensed under reduced pressure. The product, 4-(2-(2-(2-((tetrahydro-2H-pyran-2-yl)oxy) ethoxy) ethoxy) ethoxy) benzophenone, was obtained as an oily residue and used as is in next step without further purification.

Step 3

The product of Step 2 (1.1 mol) was dissolved in anhydrous dimethyl formamide (200 ml, saturated with acetylene gas) in a dry 2 L single-neck flask under magnetic stirring and nitrogen atmosphere. The flask was cooled by ice bath. Sodium acetylide in mineral oil slurry (320 g, 18% by weight) was added to the flask in portions. The resulting mixture was stirred for 30 minutes. The mixture was slowly poured into ice water (500 ml) under stirring, then extracted with ethyl acetate (2×500 mL). The top layers were combined and dried over sodium sulfate, filtered and condensed under reduced pressure. The product, 1-phenyl-1-(2-(2-(2-((tetrahydro-2H-pyran-2-yl)oxy) ethoxy) ethoxy) ethoxy) phenyl-2-propyn-1-ol, was obtained as an oily residue and used for the next step without further purification.

Step 4

To a 2 L single-neck round bottom flask equipped with magnetic stirring was added solid 9-bromo-2,3-dimethoxy-7,7-dipropyl-7H-benzo[c]fluoren-5-ol (100 g), p-toluenesulfonic acid hydrate (2 g) and toluene (500 ml). A solution of the above Step 3 product in toluene was added to the mixture over time until a minimal naphthol peak was observed by HPLC analysis. Methanol (50 ml) was added to the mixture. The mixture was heated to 50° C. for 2 hours. The mixture was then cooled to room temperature and filtered through a silica gel column. The product was washed off with 70% ethyl acetate and 30% hexanes mixed solvent. The major dye fraction was collected and condensed to lesser volume under reduced pressure (180 g). The product was obtained as an oily residue and used as is in next step without further purification. NMR analysis indicated the structure was consistent with 6-methoxy-7-(piperidin-1-yl)-11-bromo-13,13-dipropyl-3-phenyl-3-(2-(2-(1-hydroxyethoxy) ethoxy) ethoxy)phenyl-3H, 13H-indeno[2',3': 3,4]naphtho[1,2-b]pyran as shown in the following graphic formula.

Step 5

In a 1 L single-necked round-bottom flask equipped with magnetic stirring, the product from Step 4. (150 g), phenylboronic acid (29 g), sodium carbonate (35 g), toluene (200 ml)/DMF (200 ml)/ethanol (50 ml)/water (50 ml) were combined under a nitrogen atmosphere. The resulting mixture was bubbled with nitrogen for 20 minutes. Tetrakis (triphenylphosphine) palladium (0) (5 g) was added to the mixture. The reaction mixture was then heated to 90° C. for 1 hour and then to 95° C. for 1 hour. The reaction mixture was cooled to 50° C. Ethyl acetate (350 ml), water (350 ml) and Celite (300 g) were added to the mixture. The resulting slurry was stirred for 45 minutes. The slurry was then filtered and the filtrate was poured into 3 L separation funnel. The top layer was isolated and washed with water (350 ml). The bottom layer was washed with ethyl acetate (250 ml). The top organic layers were combined and filtered over anhydrous magnesium sulfate. The filtrate was condensed to lesser volume under reduced pressure. The resulting residue was filtered through a silica gel plug column. The major dye fraction was collected and condensed to completely strip off solvent under reduced pressure. The product was obtained as an oily residue and used as is in next step without further purification. NMR analysis indicated the structure was consistent with 6-methoxy-7-(piperidin-1-yl)-11-phenyl-13,13-dipropyl-3-phenyl-3-(2-(2-(1-hydroxyethoxy) ethoxy) ethoxy)phenyl-3H, 13H-indeno[2',3': 3,4]naphtho[1,2-b] pyran.

Step 6

In a 2 L single-neck round bottom flask equipped with magnetic stirring, the product from Step 5 was dissolved in anhydrous DCM (1.2 L). Solid camphorsulfonic acid (0.6 g) was added to the flask. The flask was cooled by ice/brine bath (−5 to 0° C.). Liquid 3,4-dihydro-2H-pyran (35 ml) was dropped into the flask through additional funnel over 5 minutes. The mixture was stirred at −5 to 0° C. for 5 hours. Sodium bicarbonate solution (5 g in 450 ml water) was added to the mixture and the mixture was stirred for 15 minutes. The mixture was poured into 2 L separation funnel. The bottom layer was isolated and dried over sodium sulfate. The solution was filtered and condensed to lesser volume under reduced pressure. The oily residue was filtered through large silica gel plug column. The desired less polar dye fraction was collected and condensed to completely strip off solvent under reduced pressure. The product was obtained as an oily residue (150 g) and used as is in next step without further purification. NMR analysis indicated the structure was consistent with 6-methoxy-7-(piperidin-1-yl)-11-phenyl-13,13-dipropyl-3-phenyl-3-(2-(2-(-2-((tetra-hydro-2H-pyran-2-yl)oxy) ethoxy) ethoxy) ethoxy)phenyl-3H,13H-indeno[2',3':3,4]naphtho[1,2-b]pyran.

Step 7

In a 2 L dry single-neck round bottom flask equipped with magnetic stirring, product from Step 6 (110 g) and piperidine (15 ml) were dissolved in anhydrous tetrahydrofuran (500 ml). The flask was cooled with ice bath (0° C.). Solution of n-butyl lithium in hexanes was dropped into the flask through addition funnel over 15 minutes. Dark brown solution was formed upon the addition. Cooling bath was removed. The mixture was stirred for 45 minutes. Water (500 ml) and ethyl acetate (250 ml) were added to the mixture. The resulting mixture was transferred to 2 L separation funnel. The top organic layer was isolated and condensed to lesser volume under reduced pressure.

THP deprotection—In 1 L dry single-neck round bottom flask equipped with magnetic stirring, the above residue was dissolved in dichloromethane (500 ml) and methanol (150 ml). Para-toluenesulfonic acid hydrate (25 g) was added to the mixture. The mixture was heated to 40° C. for 1 hour. The mixture was cooled to room temperature and filtered through a silica gel plug column. The major dye fraction was collected and condensed. The residue was further purified by silica gel chromatography. The product was obtained as an oily residue (60 g) and used as is in next step without further purification. NMR analysis indicated the structure was consistent with 6-methoxy-7-(piperidin-1-yl)-11-phenyl-13,13-dipropyl-3-phenyl-3-(2-(2-(1-hydroxyethoxy) ethoxy) ethoxy)phenyl-3H,13H-indeno[2',3':3,4]naphtho[1,2-b] pyran.

Step 8

In a dry 1 L single-neck round bottom flask equipped with magnetic stirring, product from Step 7. (60 g), 4-(Dimethylamino)pyridine (1 g), triethylamine (35 ml), 2,6-Di-tert-butyl-4-methylphenol (0.4 g) and methacrylic anhydride (35 ml) were dissolved in anhydrous dichloromethane (350 ml).

The mixture was heated to 35° C. for 1.5 hours. Methanol (20 ml) was added to the mixture to quench excess amount of methacrylic anhydride. Toluene (100 ml) was added to the mixture. The mixture was condensed under reduced pressure to remove methanol and dichloromethane. The remaining solution was filtered over silica gel plug. The dark dye fraction was collected and condensed to lesser volume under reduced pressure. The residue was further purified by silica gel chromatography. The desired dye product fraction was collected and condensed to lesser volume under reduced pressure. Recrystallization in t-butyl methyl ether and methanol mixed solvent to afford solid dye product (50 g). NMR analysis indicated the structure of the compound of CE-1 was consistent with 6-methoxy-7-(piperidin-1-yl)-11-phenyl-13,13-dipropyl-3-phenyl-3-(2-(2-(1-methacroy-lethoxy)ethoxy)ethoxy)phenyl-3H,13H-indeno[2',3':3,4] naphtho[1,2-b]pyran, as represented by the following graphic formula. The resulting compound was formulated into a coating composition as described in Part 2 of U.S. Pat. No. 8,608,988 B2. Upon exposure to UV light, the compound exhibited a dark brown color.

CE-1

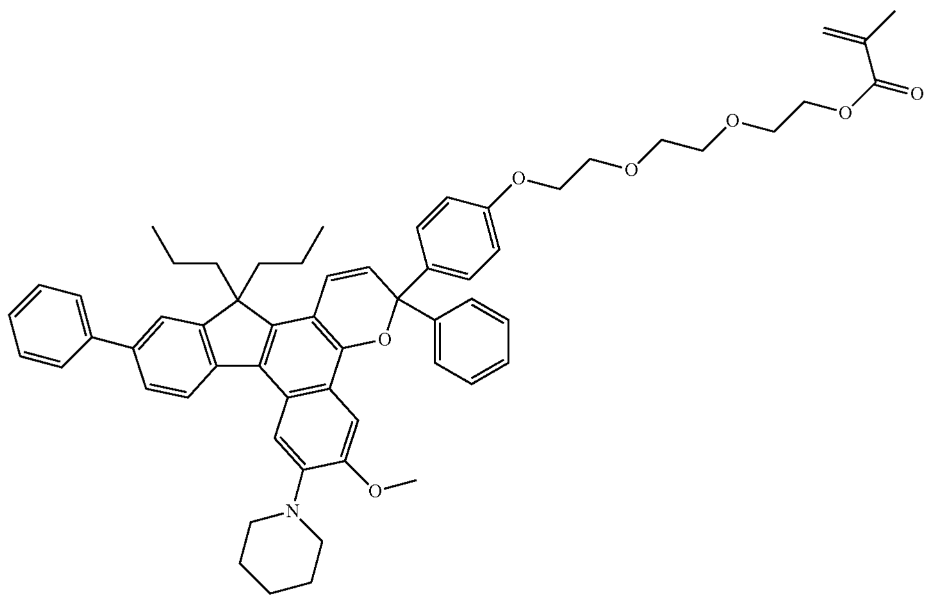

Comparative Example CE-2

A comparative indenonaphthopyran compound CE-2 was prepared as described in Example 3 of U.S. Pat. No. 9,139,552 B2. NMR analysis indicated the structure of the compound of CE-2 was consistent with 6-Methoxy-7-(piperidin-1-yl)-13,13-dimethyl-3-phenyl-3-(4-(4-(4-(2-(methacryloxy) ethoxy)-4-oxobutanoyl) piperazin-1-yl) phenyl-3H,13H-indeno[2',3': 3,4]naphtho[1,2-b]pyran, as represented by the following graphic formula. The resulting compound was formulated into a coating composition as described in Part 2 of U.S. Pat. No. 8,608,988 B2. Upon exposure to UV light, the compound exhibited a purple color.

CE-2

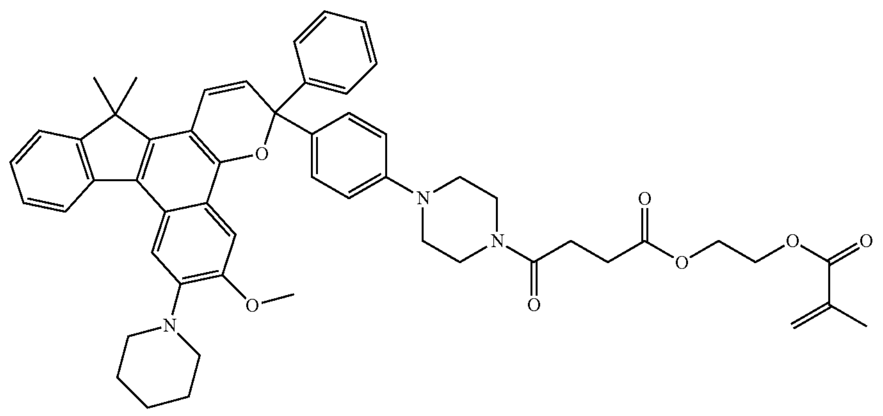

Comparative Example CE-3

The synthesis of comparative example CE-3 was similar to Example 2 of U.S. Pat. No. 9,139,552 B2, but in which 2,3-dimethoxy-7,7-dimethyl-9-(4-t-butylphenyl)-7H-benzo[C]fluoren-5-ol was used as a starting material in place of 2,3-dimethoxy-7,7-dimethyl-9-(2-methoxyphenyl)-7H-benzo[C]fluoren-5-ol. Additionally, in Step 3, methacrylic anhydride was used in place of 2-isocyanatoethyl methacrylate, to form the desired substitution. NMR analysis indicated the structure of the compound of CE-3 was consistent with 6-methoxy-7-((3-methacryloxymethyl)piperidin-1-yl)-11-(4-t-butylphenyl)-13,13-dimethyl-3-(4-morpholinophenyl)-3-phenyl-3H,13H-indeno[2',3':3,4]naphtho[1,2-b]pyran, as represented by the following graphic formula. The resulting compound was formulated into a coating composition as described in Part 2 of U.S. Pat. No. 8,608,988 B2. Upon exposure to UV light, the compound exhibited a dark purple color.

CE-3

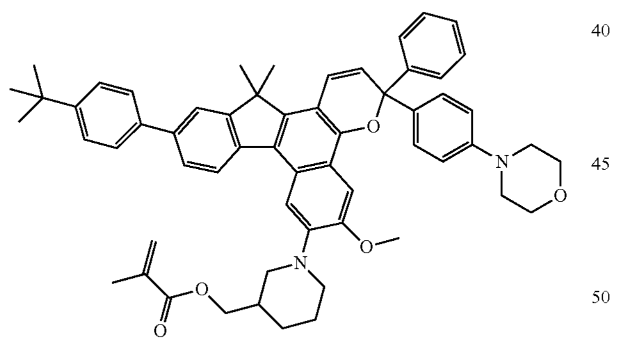

Example 4

The synthesis of the compound of Example 4 followed that of Comparative Example CE-1 as described above, except in Step 5 an equal molar amount of 4-(trimethylsilyl)phenylboronic acid was used in place of phenylboronic acid. NMR analysis indicated the structure of the compound of Example 4 was consistent with 6-methoxy-7-(piperidin-1-yl)-11-(4-trimethylsilylphenyl)-13,13-dipropyl-3-phenyl-3-(2-(2-(1-methacroylethoxy) ethoxy) ethoxy)phenyl-3H,13H-indeno[2',3': 3,4]naphtho[1,2-b]pyran, as represented by the following graphic formula. The resulting compound was formulated into a coating composition as described in Part 2 of U.S. Pat. No. 8,608,988 B2. Upon exposure to UV light, the compound exhibited a dark brown color.

Example 4

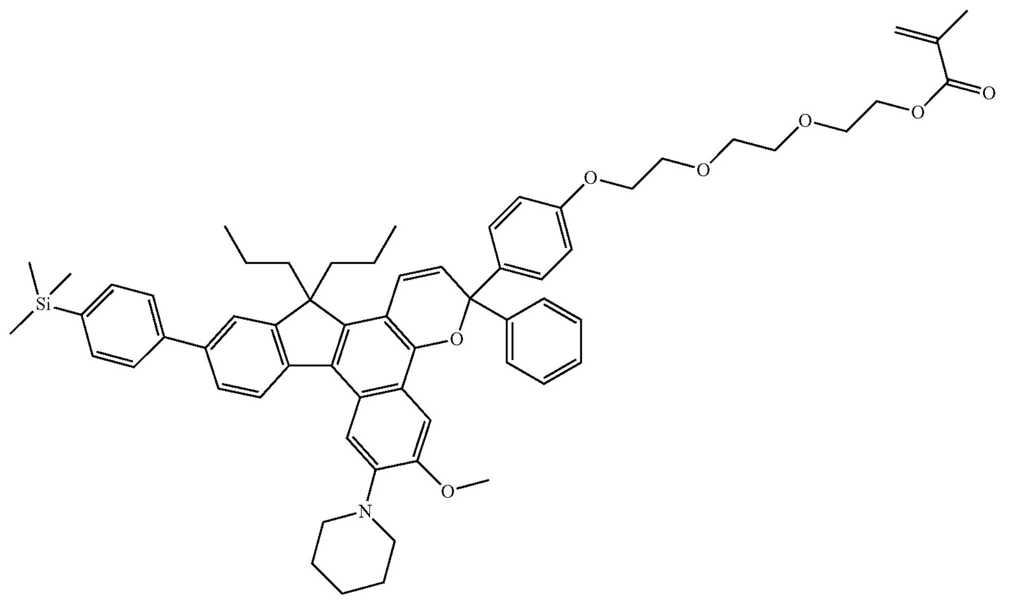

Example 5

The synthesis of the compound of Example 5 was similar to that of Comparative Example CE-2, except in Step 1, an equimolar amount of 2,3-dimethoxy-7,7-dimethyl-9-trimethylsilyl-7H-benzo[C]fluoren-5-ol, was used in place of the 2,3-dimethoxy-7,7-dimethyl-7H-benzo[C]fluoren-5-ol. NMR analysis indicated the structure of the compound of Example 5 was consistent with 6-methoxy-7-(piperidin-1-yl)-11-trimethylsilyl-13,13-dimethyl-3-phenyl-3-(4-(4-(4-(2-(methacryloxy) ethoxy)-4-oxobutanoyl) piperazin-1-yl) phenyl-3H,13H-indeno[2',3': 3,4]naphtho[1,2-b]pyran, as represented by the following graphic formula. The resulting compound was formulated into a coating composition as described in Part 2 of U.S. Pat. No. 8,608,988 B2. Upon exposure to UV light, the compound exhibited a purple color.

Example 6

The synthesis of the compound of Example 3 was similar to that of Comparative Example CE-3, except in Step 2, 1-(4-trimethylsilylphenyl)-1-(4-morpholinophenyl)-2-propyn-1-ol was used in place of 1-phenyl-1-(4-morpholinophenyl)-2-propyn-1-ol. NMR analysis indicated the structure of the compound of Example 6 was consistent with 6-methoxy-7-((3-methacryloxymethyl) piperidin-1-yl)-11-(4-t-butylphenyl)-13,13-dimethyl-3-(4-morpholinophenyl)-3-(4-trimethylsilylphenyl)-3H,13H-indeno[2',3': 3,4]naphtho[1,2-b]pyran, as represented by the following graphic formula. The resulting compound was formulated into a coating composition as described in Part 2 of U.S. Pat. No. 8,608,988 B2. Upon exposure to UV light, the compound exhibited a dark purple color.

Example 5

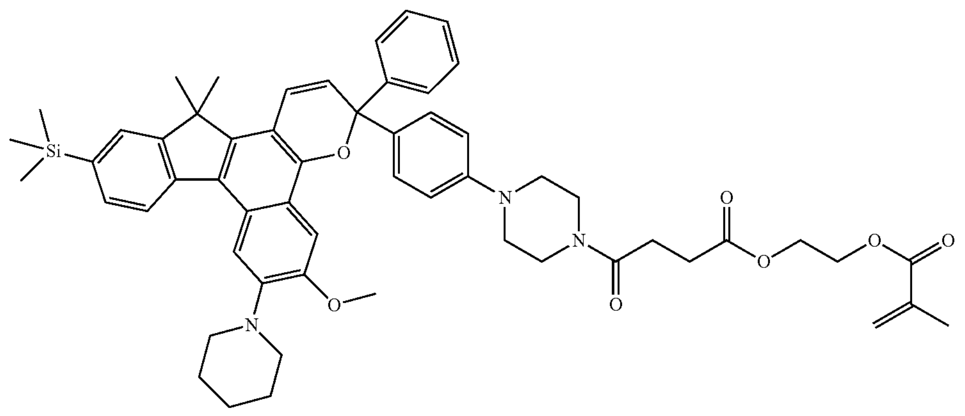

Example 6

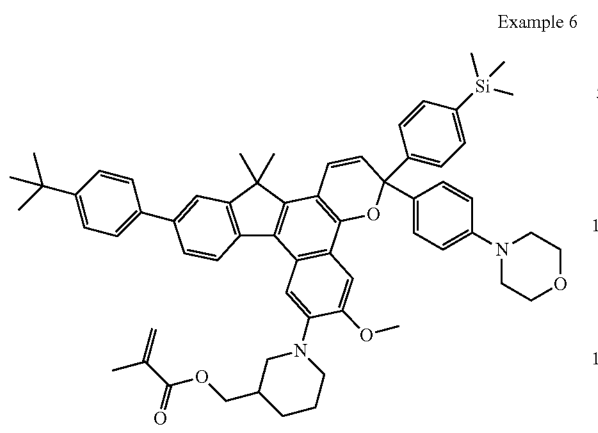

Part-2

Solubility Evaluation

Polymerizable Polysiloxane-Containing Formulation:

A polymerizable polysiloxane-containing formulation was prepared by mixing together the ingredients and in the amounts as tabulated in the following Table 1.

TABLE 1

| Component | Mass (g) |
|---|---|
| 3-(3-methacryloxy-2-hydroxypropoxy)propylbis(trimethylsiloxy)methylsilane | 1.46 |
| Poly(N-vinyl pyrrolidone) (K value 90) | 0.36 |
| N,N-dimethylacrylamide | 1.25 |
| MCR-M11[(1)] | 1.61 |
| 2-Hydroxyethyl methacrylate | 0.31 |
| 3,7-dimethyl-3-octanol | 1.15 |

[(1)]Monomethacryloxypropyl terminated polydimethylsiloxane, commercially available from Gelest, Inc.

Solubility Evaluation:

The photochromic compounds of Comparative Examples CE-1 and CE-2, and Examples 4 and 5, prepared as described in Part-1, were each added to a polymerizable polysiloxane-containing formulation according to Table 1, to form Polymerizable Photochromic Compositions A, B, C, and D, as summarized in the following Table 2. The Polymerizable Photochromic Compositions were each stirred for 24 hours at room temperature after which the solubility of the photochromic compounds was determined by visual observation. As summarized in the following Table 2, Polymerizable Photochromic Compositions A and C, containing the photochromic compounds of Examples 4 and 5, were observed to be free of haze and free of suspended particles, indicating that the solubility of the photochromic compounds of Examples 4 and 5 thereof was excellent. As further summarized in the following Table 2, Polymerizable Photochromic Compositions B and D, containing the comparative photochromic compounds of Comparative Examples CE-1 and CE-2, were observed to include suspended solid particles, indicating that the solubility of the photochromic compounds of Comparative Examples CE-1 and CE-2 thereof was poor.

TABLE 2

| Polymerizable Photochromic Composition | Polymerizable Formulation[(2)] (g) | Photochromic Compound | Amount of Photochromic Compound (g) | Observed Solubility |
|---|---|---|---|---|
| A | 1.50 | Example 4 | 0.06 | Excellent |
| B | 1.50 | CE-1 | 0.06 | Poor |
| C | 1.50 | Example 5 | 0.06 | Excellent |
| D | 1.50 | CE-2 | 0.06 | Poor |

[(2)]The polymerizable polysiloxane-containing formulation of Table 1.

The present invention has been described with reference to specific details of particular embodiments thereof. It is not intended that such details be regarded as limitations upon the scope of the invention except insofar as to the extent that they are included in the accompanying claims.

The invention claimed is:

1. An indenonaphthopyran compound represented by the following Formula (I), (I)

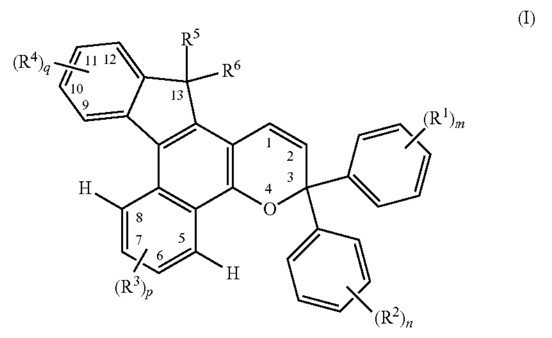

wherein, m is from 0 to 3, n is from 0 to 3, p is 1 or 2, q is from 0 to 4, $R^1$ independently for each m, $R^2$ independently for each n, $R^3$ independently for each p, and $R^4$ independently for each q, in each case is independently, hydroxyl;
cyano;
(meth)acrylate or (meth)acrylamide;
vinylphenyl;
amino, or substituted nitrogen-containing heterocycle, or unsubstituted nitrogen-containing heterocycle;
a halo group;
a perhalo alkyl, or a perhalo aryl;
substituted or unsubstituted alkyl;
substituted or unsubstituted alkenyl;
substituted or unsubstituted alkynyl;
substituted or unsubstituted heterocycloalkyl;
substituted or unsubstituted aryl;
substituted or unsubstituted heteroaryl;
substituted or unsubstituted alkoxy or substituted or unsubstituted aryloxy;
substituted or unsubstituted alkylthio or substituted or unsubstituted arylthio;
ketone, aldehyde, carboxylic acid ester, carboxylic acid, carboxylate, or amide;
carbonate, carbamate, carbonyl amino, or urea;
polyether, polyester, polycarbonate, or polyurethane;
siloxy, alkoxysilane, or polysiloxane;
trialkylsilyl; or
combinations thereof; and $R^5$ and $R^6$ are each independently,
substituted or unsubstituted alkyl;
substituted or unsubstituted aryl;
polyether, polyester, polycarbonate, or polyurethane;
trialkylsilyl; or
$R^5$ and $R^6$ together form a spirocyclic ring, wherein each nitrogen-containing heterocycle substituent, each alkyl substituent, each alkenyl substituent, each alkynyl substituent, each heterocycloalkyl substituent, each aryl substituent, each heteroaryl substituent, each alkoxy substituent, each aryloxy substituent, each alkylthio substituent, and each arylthio substituent, are in each case independently selected from,
halo, cyano, nitro, alkyl, alkenyl, alkynyl, haloalkyl, perhaloalkyl, heterocycloalkyl, aryl, heteroaryl, hydroxyl, thiol, alkyl ether, alkyl thioether, aryl ether, aryl thioether, ketone, aldehyde, carboxylic acid ester, carboxylic acid, carboxylate, siloxane, alkoxysilane, polysiloxane, amide, amino, nitrogen-containing heterocycle, alkyl amine, aryl amine, carbamate, carbonate, urea, polyester group, polyether group, polycarbonate group, polyurethane group, trialkylsilyl, an acrylate group, a methacrylate group, an acrylamide group, a methacrylamide group, a vinylphenyl group, combinations thereof, or two or more thereof, provided that said indenonaphthopyran compound comprises,
(i) at least one trialkylsilyl group, and
(ii) at least one ethylenically unsaturated radically polymerizable group selected from vinylphenyl, acrylate, methacrylate, acrylamide, or methacrylamide, wherein one of:
m is at least 1, and one $R^1$ is selected from trialkylsilyl group;
or
q is at least 1, and $R^4$ at position-11 is selected from trialkylsilyl group, or trialkylsilyl mono-substituted phenyl group.

2. The indenonaphthopyran compound of claim 1, wherein, $R^1$ independently for each m, $R^2$ independently for each n, $R^3$ independently for each p, and $R^4$ independently for each q, in each case is independently,
hydroxyl;
cyano;
(meth)acrylate or (meth)acrylamide;
vinylphenyl;
amino, or substituted nitrogen-containing heterocycle, or unsubstituted nitrogen-containing heterocycle;
a halo group;
a perhalo alkyl, or perhalo phenyl;
substituted or unsubstituted alkyl;
substituted or unsubstituted phenyl;
substituted or unsubstituted alkoxy;
ketone, aldehyde, carboxylic acid ester, carboxylic acid, carboxylate, or amide;
carbonate, carbamate, carbonyl amino, or urea;
polyether;
siloxy, or alkoxysilane;
trialkylsilyl; or
combinations thereof; and $R^5$ and $R^6$ are each independently,
substituted or unsubstituted alkyl, or
trialkylsilyl;

wherein each nitrogen-containing heterocycle substituent, each alkyl substituent, each phenyl substituent, and each alkoxy substituent, are in each case independently selected from,
halo, cyano, nitro, alkyl, alkenyl, alkynyl, haloalkyl, perhaloalkyl, heterocycloalkyl, phenyl, heteroaryl, hydroxyl, thiol, alkyl ether, alkyl thioether, phenyl ether, phenyl thioether, ketone, aldehyde, carboxylic acid ester, carboxylic acid, carboxylate, siloxane, alkoxysilane, amide, amino, nitrogen-containing heterocycle, alkyl amine, phenyl amine, carbamate, carbonate, urea, polyether group, trialkylsilyl, an acrylate group, a methacrylate group, an acrylamide group, a methacrylamide group, a vinylphenyl group, combinations thereof, or two or more thereof, provided that said indenonaphthopyran compound comprises,
(i) at least one trialkylsilyl group, and
(ii) at least one ethylenically unsaturated radically polymerizable group selected from vinylphenyl, acrylate, methacrylate, acrylamide, or methacrylamide.

3. The indenonaphthopyran compound of claim 1, wherein:
m is at least one, and one $R^1$ is trialkylsilyl; and
p is 2.

4. The indenonaphthopyran compound of claim 1, wherein,
$R^3$ independently for each p is selected from,
alkoxy,
amino,
unsubstituted nitrogen-containing heterocycle, or
substituted nitrogen-containing heterocycle,
wherein each substituent of the substituted nitrogen-containing heterocycle independently comprises acrylate, methacrylate, acrylamide, or methacrylamide.

5. The indenonaphthopyran compound of claim 4, wherein,
p is 2,
$R^3$ at position-6 is alkoxy; and
$R^3$ at position-7 is selected from,
amino, unsubstituted nitrogen-containing heterocycle, or substituted nitrogen-containing heterocycle, wherein each substituent of the substituted nitrogen-containing heterocycle independently comprises acrylate, methacrylate, acrylamide, or methacrylamide.

6. The indenonaphthopyran compound of claim 1, wherein one of:

(A) m is at least 1, and one $R^1$ is represented by one of the following Formula (V) or Formula

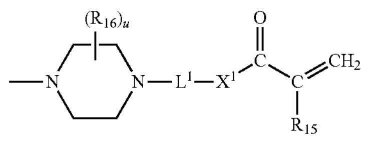

(V)

wherein for Formula (V), $R_{15}$ is hydrogen or methyl, $X^1$ is O or NH, u is 0 to 4, $R_{16}$ independently for each u is alkyl or cycloalkyl, and $L^1$ is divalent alkyl, or a divalent group represented by the following Formula (Va),

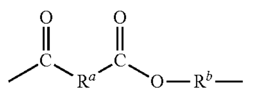

(Va)

wherein for Formula (Va), $R^a$ and $R^b$ are each independently selected from divalent alkyl, or

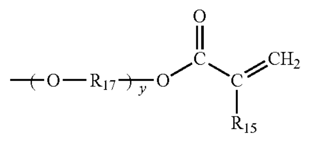

(VI)

wherein for Formula (VI), $R_{15}$ is hydrogen or methyl, y is 1 to 20, and $R_{17}$ independently for each y is divalent alkyl;

or (B) p is at least 1, and $R^3$ at position-7 is represented by the following Formula (VII),

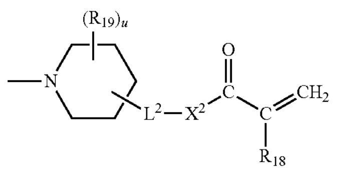

(VII)

wherein for Formula (VII), $R_{18}$ is hydrogen or methyl, $X^2$ is O or NH, $L^2$ is a single bond or divalent alkyl, u is 0 to 4, and $R_{19}$ independently for each u is alkyl or cycloalkyl.

7. The indenonaphthopyran compound of claim 1, wherein:

p is 2, $R^3$ at position-6 is alkoxy, and $R^3$ at position-7 is unsubstituted nitrogen-containing heterocycle;

q is at least one, and $R^4$ at position-11 is trialkylsilyl or trialkylsilyl mono-substituted phenyl; and m is at least one, and one $R^1$ is represented by one of the following Formula (V) or Formula (VI),

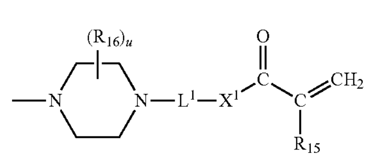

(V)

wherein for Formula (V), $R_{15}$ is hydrogen or methyl, $X^1$ is O or NH, u is 0 to 4, $R_{16}$ independently for each u is alkyl or cycloalkyl, and $L^1$ is divalent alkyl, or a divalent group represented by the following Formula (Va),

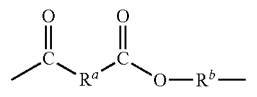

(Va)

wherein for Formula (Va), $R^a$ and $R^b$ are each independently selected from divalent alkyl, or

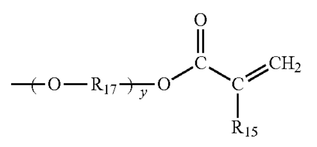

(VI)

wherein for Formula (VI), $R_{15}$ is hydrogen or methyl, y is 1 to 20, and $R_{17}$ independently for each y is divalent alkyl.

8. The indenonaphthopyran compound of claim 1, wherein each trialkylsilyl group is a trimethylsilyl group.

9. A photochromic composition comprising the indenonaphthopyran compound of claim 1.

10. The photochromic composition of claim 9, wherein said photochromic composition is a polymerizable photochromic composition further comprising (meth)acrylate functional polydimethylsiloxane.

11. A photochromic article comprising the indenonaphthopyran compound of claim 1, wherein the photochromic article is selected from the group consisting of ophthalmic articles, display articles, windows, mirrors, active liquid crystal cell articles, and passive liquid crystal cell articles.

12. The photochromic article of claim 11, wherein the ophthalmic articles are selected from corrective lenses, non-corrective lenses, contact lenses, intra-ocular lenses, magnifying lenses, protective lenses, and visors.

* * * * *